United States Patent
Vogan et al.

(10) Patent No.: US 9,361,036 B2
(45) Date of Patent: Jun. 7, 2016

(54) CORRECTION OF BLOCK ERRORS FOR A SYSTEM HAVING NON-VOLATILE MEMORY

(71) Applicant: Apple Inc., Cupertino, CA (US)

(72) Inventors: Andrew W. Vogan, Portland, OR (US); Daniel J. Post, Pacifica, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/754,468

(22) Filed: Jun. 29, 2015

(65) Prior Publication Data
US 2015/0301760 A1 Oct. 22, 2015

Related U.S. Application Data

(62) Division of application No. 13/829,088, filed on Mar. 14, 2013, now Pat. No. 9,069,695.

(51) Int. Cl.
| | |
|---|---|
| *G11C 29/00* | (2006.01) |
| *G06F 3/06* | (2006.01) |
| *G06F 11/10* | (2006.01) |

(52) U.S. Cl.
CPC ............ *G06F 3/0619* (2013.01); *G06F 3/0631* (2013.01); *G06F 3/0679* (2013.01); *G06F 11/1004* (2013.01); *G06F 11/1008* (2013.01); *G06F 11/1048* (2013.01)

(58) Field of Classification Search
None
See application file for complete search history.

(56) References Cited

U.S. PATENT DOCUMENTS

| | | |
|---|---|---|
| 6,529,997 B1 | 3/2003 | Debiez et al. |
| 7,139,863 B1 | 11/2006 | Defouw et al. |
| 7,345,941 B2 | 3/2008 | Matsui |
| 7,366,825 B2 | 4/2008 | Williams et al. |
| 7,389,397 B2 | 6/2008 | Paley et al. |
| 7,533,330 B2 | 5/2009 | Anderson et al. |
| 8,176,284 B2 | 5/2012 | Frost et al. |
| 8,438,455 B2 | 5/2013 | Vogan et al. |
| 8,605,489 B2 | 12/2013 | Reohr et al. |
| 2005/0091569 A1 | 4/2005 | Chao |
| 2006/0064539 A1 | 3/2006 | Mukaida et al. |
| 2006/0212744 A1 | 9/2006 | Benner et al. |
| 2007/0022241 A1 | 1/2007 | Sinclair |
| 2007/0083697 A1 | 4/2007 | Birrell et al. |
| 2007/0268905 A1 | 11/2007 | Baker et al. |
| 2008/0010580 A1 | 1/2008 | Anderson et al. |
| 2008/0098157 A1 | 4/2008 | Andrewartha et al. |
| 2008/0126848 A1 | 5/2008 | Yoshida |
| 2008/0250270 A1 | 10/2008 | Bennett |
| 2008/0270730 A1 | 10/2008 | Lasser et al. |
| 2008/0288712 A1 | 11/2008 | Cornwell et al. |
| 2009/0100115 A1 | 4/2009 | Park et al. |
| 2009/0157950 A1 | 6/2009 | Selinger |
| 2009/0158085 A1 | 6/2009 | Kern et al. |
| 2009/0172262 A1 | 7/2009 | Olbrich et al. |

(Continued)

FOREIGN PATENT DOCUMENTS

| | | |
|---|---|---|
| EP | 0242595 | 10/1987 |
| WO | 2005/043378 | 5/2005 |

*Primary Examiner* — Daniel McMahon
(74) *Attorney, Agent, or Firm* — Van Court & Aldridge LLP

(57) ABSTRACT

Systems and methods are disclosed for correcting block errors. In particular, a system can store a parity page per page-modulo, where a pre-determined number of pages of a block or a band of the NVM may be allocated as page-modulo XOR ("PMX") parity pages. This enables a space efficient approach for recovering from single-block data errors.

19 Claims, 6 Drawing Sheets

(56) References Cited

U.S. PATENT DOCUMENTS

| | | |
|---|---|---|
| 2009/0172335 A1 | 7/2009 | Kulkarni et al. |
| 2010/0074012 A1 | 3/2010 | Park et al. |
| 2010/0131697 A1 | 5/2010 | Alrod et al. |
| 2010/0281341 A1 | 11/2010 | Wu et al. |
| 2011/0022780 A1 | 1/2011 | Wakrat et al. |
| 2011/0072189 A1 | 3/2011 | Post et al. |
| 2011/0107013 A1 | 5/2011 | Ho |
| 2011/0238629 A1 | 9/2011 | Post et al. |
| 2011/0238886 A1 | 9/2011 | Post et al. |
| 2014/0201596 A1 | 7/2014 | Baum et al. |
| 2014/0298137 A1* | 10/2014 | Dhuse ............ G06F 11/1076 714/763 |

\* cited by examiner

CORRECTION OF BLOCK ERRORS FOR A SYSTEM HAVING NON-VOLATILE MEMORY

This application is a divisional of U.S. patent application Ser. No. 13/829,088 filed Mar. 14, 2013, which is hereby incorporated herein by reference.

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

NVMs may suffer from various types of defects over time. Due to the physical architecture of some devices, a substantial portion of NVM errors can be caused by word line shorts. For devices with limited storage space in the NVM, data recovery from word line shorts can be challenging because there is less space available for storing error correcting data.

SUMMARY OF THE DISCLOSURE

Systems and methods are disclosed for correction of block errors for a system having non-volatile memory ("NVM"). In particular, the system can store a parity page per page-modulo, where a pre-determined number of pages of a block or a band of the NVM may be allocated as page-modulo XOR ("PMX") parity pages. This can be a space efficient approach for recovering from single-block data errors such as, for example, single-page uncorrectable error-correcting codes ("uECCs") and/or errors caused by word line shorts.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for correction of block errors for a system having non-volatile memory ("NVM") are provided. In particular, the system can store a parity page per page-modulo, where a pre-determined number of pages of a block or a band of the NVM may be allocated as page-modulo XOR ("PMX") parity pages. This can be a space efficient approach for recovering from single-block data errors such as, for example, single-page uncorrectable error-correcting codes ("uECCs") and/or errors caused by word line shorts. For NVMs that include more than one die, a single PMX parity page can be shared among multiple dies.

In some embodiments, the number of PMX parity pages that is allocated may depend on the number of pages that are associated with a word line short. For example, if a word line short may cause eight pages to lose their data, eight pages of a block or band may be allocated as PMX parity pages.

In some embodiments, a system can select whether or not to implement an ECC technique (e.g., PMX or a die-level or plane-level parity scheme) and/or which type of ECC technique to implement based on the amount of space available in an NVM. Thus, upon detecting one or more errors in a band of the NVM, the system can determine whether an appropriate ECC technique is turned on or off. For example, the system can check the state of a band to determine whether the band has PMX, a die-level or plane-level parity scheme, or no ECC techniques. Based on the state of the band, the system can determine whether the one or more errors can be corrected.

Figure 1:
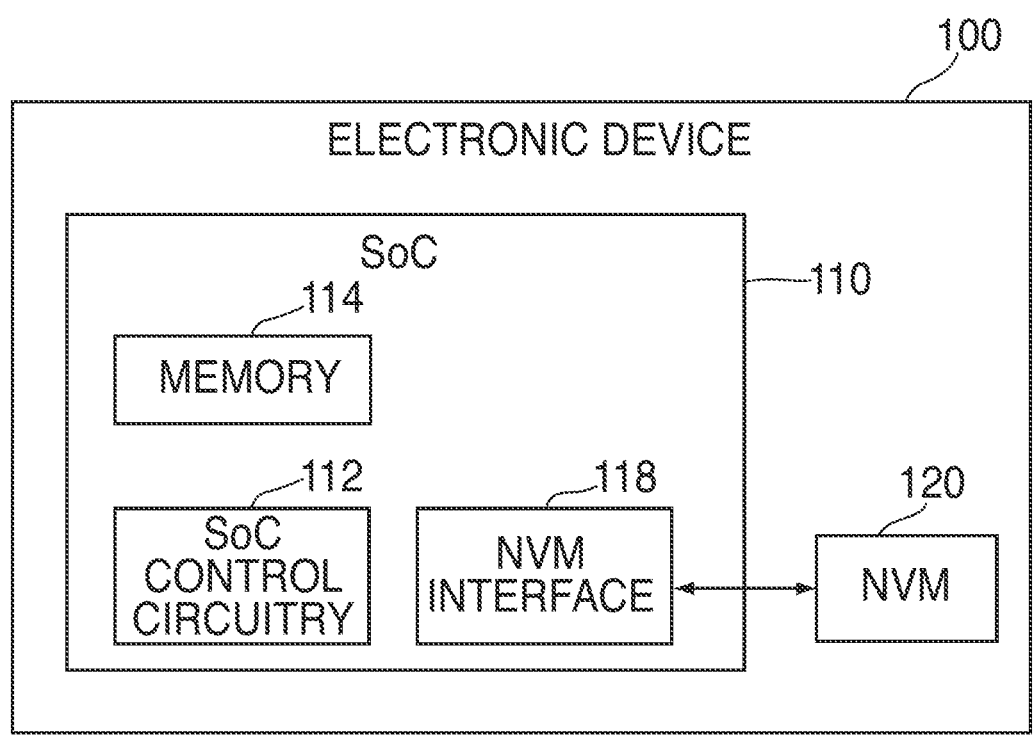
FIG. 1 is a block diagram of an electronic device configured in accordance with various embodiments of the invention.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which can the smallest erasable unit, and further organized into "pages", which can be the smallest unit that can be programmed or read. In some embodiments, NVM 120 can include multiple integrated circuits (e.g., one or more dies), where each integrated circuit may have multiple blocks. Memory locations (e.g., blocks or pages of blocks) from corresponding integrated circuits may be logically grouped together to form "bands". Bands can provide operational parallelism, thereby enabling programming, reading, and erase operations to be performed in parallel for blocks located on different integrated circuits. Each memory location of NVM 120 can be referenced using a physical address (e.g., a physical page address or physical block address).

NVM 120 can be a single-plane or a multi-plane device. In the case of a multi-plane NVM, the block corresponding to each die-plane combination can be assigned a logical die's plane ("DIP") number. For example, Table 1 shows illustrative assignments of DIPs to various die-plane combinations for a dual-die dual-plane NVM (e.g., the NVM has two dies and each die is associated with a block in each plane).

TABLE 1

| Die | Plane | DIP |
|-----|-------|-----|
| 0 | 0 | 0 |
| 0 | 1 | 1 |
| 1 | 0 | 2 |
| 1 | 1 | 3 |

As shown in Table 1, the block corresponding to die 0 and plane 0 can be assigned a DIP of 0. Similarly, the block corresponding to die 0 and plane 1 can be assigned a DIP of 1, and so on. Persons skilled in the art will appreciate that the assignments shown in Table 1 are merely illustrative, and that any other suitable assignments can be used.

Physically, a block in NVM 120 can include an array of memory cells aligned in rows corresponding to word lines. Thus, various sets of pages of a block can correspond to different word lines. For example, if each block of NVM 120 has 256 pages, there may be 30 to 35 different word lines. The actual number of word lines in a block of NVM 120 may be vendor-specific.

NVM 120 may suffer from various types of defects over time. Some of these defects can be localized to a single block of a band of NVM 120. In other words, these defects do not propagate across two separate blocks on the same NVM die. For example, one type of single-block data error is a single-page uncorrectable error-correcting code ("uECC").

Another type of single-block data errors are errors caused by word line shorts. Word line shorts may occur in NVM 120 when a page associated with a particular word line is being programmed. In particular, during this programming process, a driver of the word line can create an electrical short on an adjacent word line, which may cause the pages associated with both word lines to lose their data. Word line shorts may occur more frequently if device 100 is a portable device. This is because NVM 120 may be manufactured using thinner substrates due to physical space constraints.

For example, if each word line is associated with four pages, a word line short may cause eight pages to lose their data. Consequently, in this example, there may be one or more errors (e.g., uECCs) within the scope of an eight vertical page delta. Moreover, when SoC 110 later attempts to read data from these pages, the data will be identified as uECC data.

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write requests to NVM interface 118 to obtain data from or store data in NVM 120.

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, bands, integrated circuits) of NVM 120 and the data stored therein. For example, NVM interface 118 can interpret the read or write requests from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 118.

In some embodiments, electronic device 100 can include a target device, such as a flash memory drive or SD card, that includes NVM 120 and some or all portions of NVM interface 118. In these embodiments, SoC 110 or SoC control circuitry 112 may act as the host controller for the target device. For example, as the host controller, SoC 110 can issue read and write requests to the target device.

As discussed above, NVM 120 may suffer from defects that are localized to a single block of a band. In conventional systems, a die-level or plane-level parity can be used to correct for these and other types of defects (e.g., defects that are not localized to only a single block). For example, using row-modulo XOR ("RMX"), an entire block of a band can be allocated as a parity block. This parity block, which can be located at the end of the band, can be used to store error correcting data. Upon detecting read failures in one or more blocks of the band, the error correcting data can be used to recover the data that was lost.

However, RMX may not be available on certain devices (e.g., devices that include only a single die) due to the limited physical space available for storing error correcting data. Accordingly, by storing a parity page per page-modulo, a more space efficient error correcting approach can be used for recovering from single-block data errors such as, for example, single-page uECCs and/or errors caused by word line shorts. Persons skilled in the art will appreciate that storing a parity page per page-modulo may be only a single level of an ECC technique used by a system. Hence, there may be another ECC technique that is used by the system in addition to storing a parity page per page-modulo (e.g., storing inner and/or outer ECC data on one or more pages).

In order to store a parity page per page-modulo, a predetermined number of pages of a block or a band may first be allocated as page-modulo XOR ("PMX") parity pages. The number of PMX parity pages that is allocated may depend on the number of pages that are associated with a word line short. For example, if a word line short may cause eight pages to lose their data, eight pages of a block or band may be allocated as PMX parity pages. Persons skilled in the art will appreciate that the number of pages that are allocated as PMX parity pages may be based on vendor-specific characteristics of the NVM. For instance, if there can be one or more uECCs within the scope of a twelve vertical page delta, the number of PMX parity pages may be increased to twelve.

Figure 2:
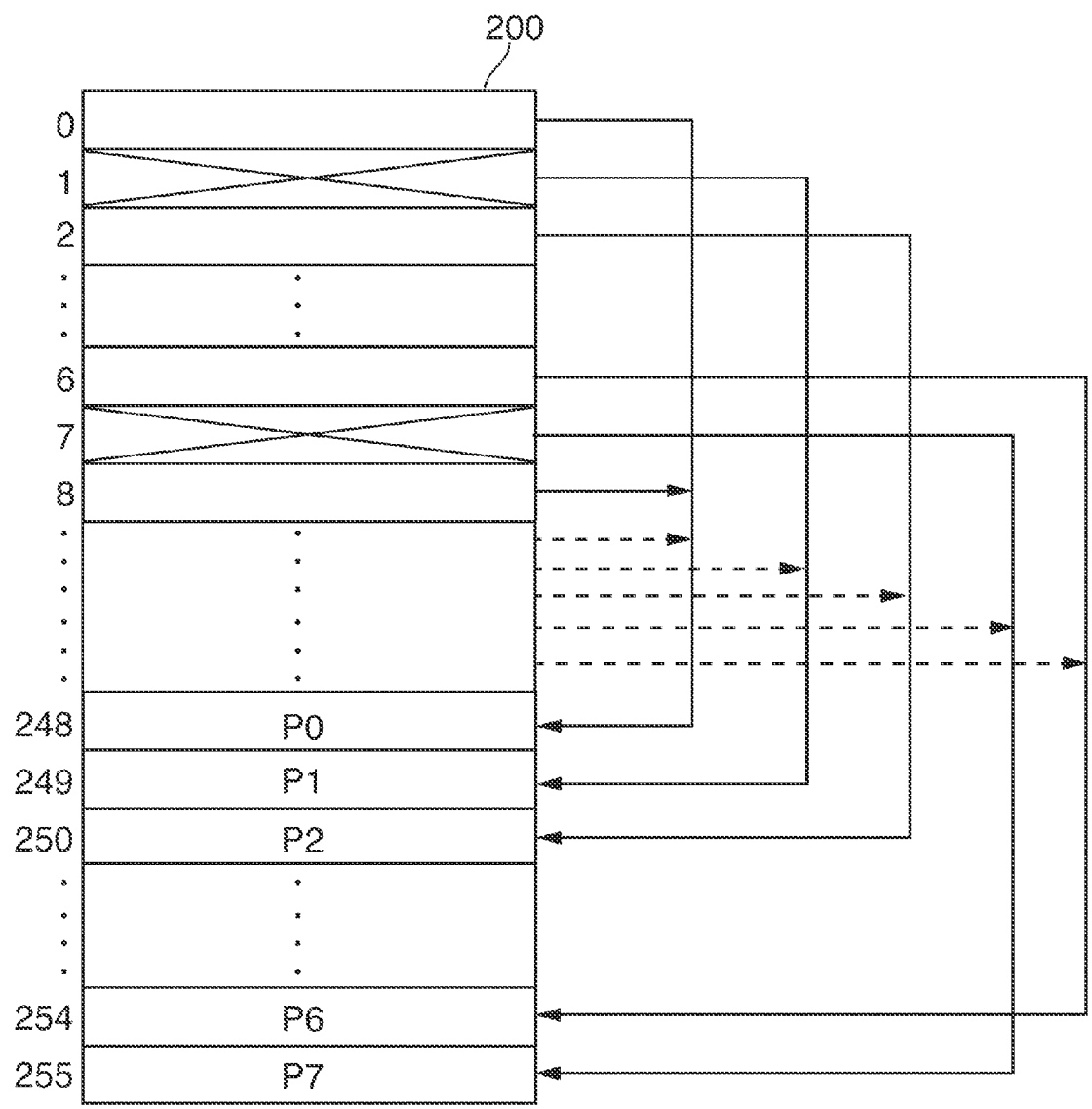
FIG. 2 is a functional view of a block of a non-volatile memory in accordance with various embodiments of the invention.

Turning now to FIG. 2, a functional view of a block 200 of a non-volatile memory (e.g., NVM 120 of FIG. 1) is shown. Block 200 can be organized into one or more pages. For example, as shown in FIG. 2, block 200 is illustrated as being organized into pages 0-255. In addition, pages that are crossed out with an "X" may represent those pages that have read errors (e.g., pages 1 and 7). Persons skilled in the art will appreciate that the specific number of pages assigned to block 200 is merely for the purpose of illustration and that block 200 can include any suitable number of pages.

As shown in FIG. 2, eight pages of block 200 may be allocated as PMX parity pages. In particular, pages 248-255 may be allocated as PMX parity pages P0-P7, respectively. As used herein, the non-PMX parity pages (e.g., pages 0-247) may sometimes be referred to as "data pages".

Because only eight PMX parity pages are assigned, this approach is relatively inexpensive in terms of physical space as compared to RMX. This can be advantageous for systems where physical space is particularly limited. For example, for a single-die single-plane NVM, the percentage of memory that needs to be allocated for PMX parity pages relative to the total amount of memory is approximately 3% (e.g., 8 PMX parity pages/(256 pages/plane*1 plane)). As another example, for a single-die dual-plane NVM, the percentage of memory that needs to be allocated for PMX parity pages relative to the total amount of memory is even less—approximately 1.56% (e.g., 8 PMX parity pages/(256 pages/plane*2 planes)).

In some embodiments, PMX parity pages may be located at the end of block 200. However, persons skilled in the art will appreciate that PMX parity pages may be located at any suitable location(s) in block 200. The memory locations where PMX parity pages can be stored may be constrained by one or more factors such as, for example, page programming rules and/or the need to program PMX data last.

Each PMX parity page may be used to store a parity of data obtained from a particular set of data pages. For example, the various sets of data pages can be determined according to:

$$a \bmod n = m \quad (1),$$

where n is the pre-determined number of PMX parity pages in block 200, m is the modulo value, and a is a data page number from a set of data pages. Thus, for block 200 of FIG. 2, n can be set to eight. Consequently, PMX parity page P0 can be used to store a parity of all data pages whose modulo 8 value is 0 (e.g., pages 0, 8, 16, 24, 32, etc.). Likewise, PMX parity page P1 can be used to store a parity of all data pages whose modulo 8 value is 1 (e.g., pages 1, 9, 17, 25, 33, etc.). In addition, PMX parity page P2 can store a parity of all data pages whose modulo 8 value is 2, and so on. For the sake of simplicity, not all of the data pages corresponding to each PMX parity page are shown in FIG. 2. Instead, dashed arrows are used to indicate that each of the PMX parity pages depicted in FIG. 2 (e.g., P0-P2, P6, and P7) correspond to additional data pages that are not shown in FIG. 2.

In some embodiments, the parity that is stored in a PMX parity page can be an XOR of the data stored in the set of data pages corresponding to the PMX parity page. For example, for PMX parity page P0, data stored in pages 0, 8, 16, 24, 32, etc. can be read and XOR-ed together. The resulting value can then be stored in PMX parity page P0. Persons skilled in the art will appreciate that use of the XOR function is merely illustrative. Thus, any suitable reversible function can be used to generate the parity values.

As discussed above, characteristics of word line shorts indicate that there may be one or more uECCs within the scope of an eight vertical page delta. That is, for each set of data pages associated with a particular PMX parity page, there may only be one read error. Consequently, a single PMX parity page can be used to recover from an error detected in a corresponding set of data pages.

Figure 3:
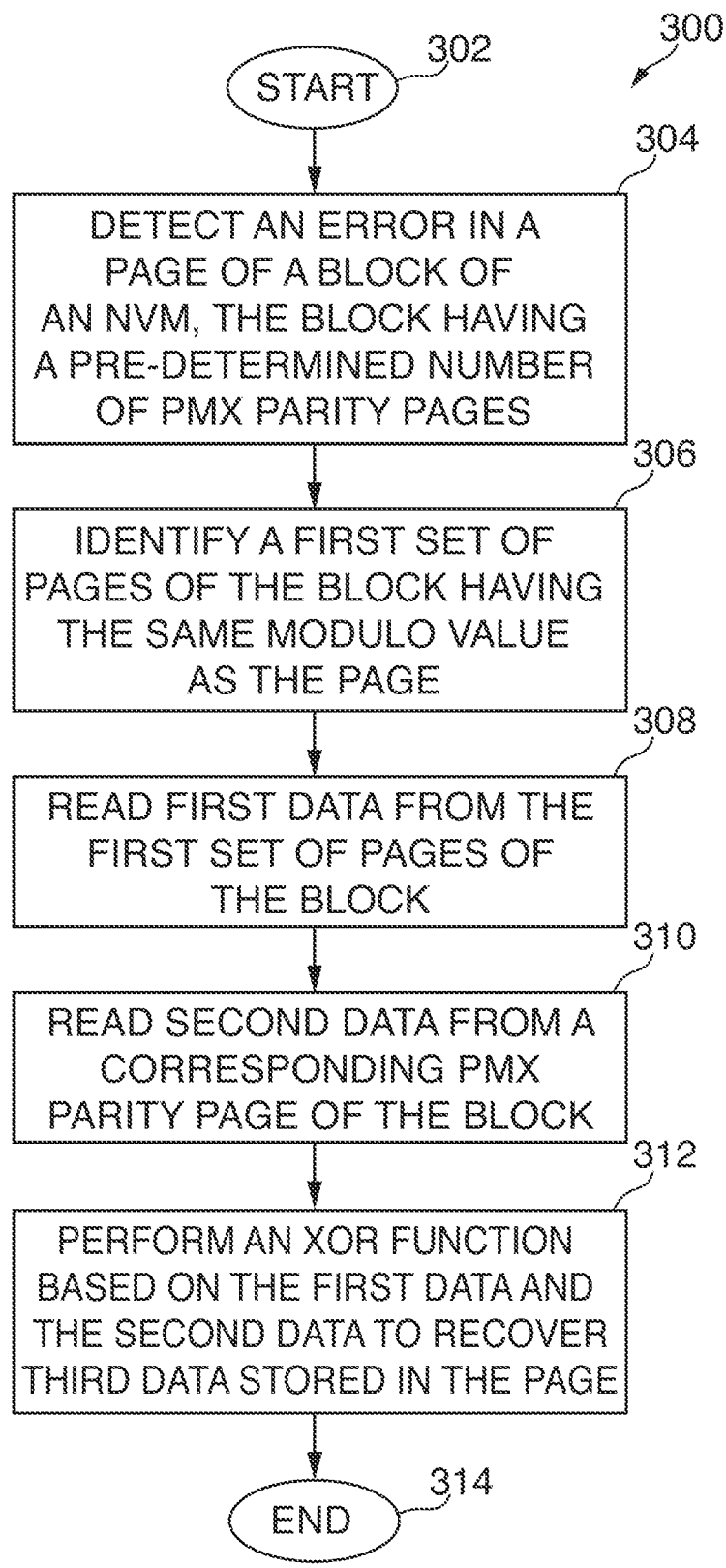
FIG. 3 is a flowchart of an illustrative process for correcting block errors in accordance with various embodiments of the invention.

Turning now to FIG. 3, a flowchart of illustrative process 300 for correcting block errors is shown. Process 300 may be executed by one or more components of a system (e.g., electronic device 100 of FIG. 1). For example, at least some of the steps may be performed by a control circuitry (e.g., SoC control circuitry 112 of FIG. 1) or an NVM interface (e.g., NVM interface 118 of FIG. 1). For the sake of simplicity, however, the steps of process 300 will be described as being performed by a control circuitry.

Process 300 may begin at step 302, and at step 304, a control circuitry can detect an error in a page of a block of an NVM, the block having a pre-determined number of PMX parity pages. For example, as shown in FIG. 2, the control circuitry can detect errors in pages 1 and 7 of block 200, where block 200 has eight PMX parity pages. In some cases, if the error is caused by a word line short, page 7 may either share a word line with page 1 or may have a word line that is adjacent to the word line of page 1.

Then, at step 306, the control circuitry can identify a first set of pages of the block having the same modulo value as the page. For example, for page 1, the control circuitry can identify pages 9, 17, 25, 33, etc. as having the same modulo value (e.g., a modulo value of 1). As another example, for page 7, the control circuitry can identify pages 15, 23, 31, 39, etc. as having the same modulo value (e.g., a modulo value of 7). In some cases, the control circuitry can use Equation (1) to identify the first set of pages.

Continuing to step 308, the control circuitry can read first data from the first set of pages of the block. For example, for page 1, the control circuitry can read data from pages 9, 17, 25, 33, etc. Similarly, for page 7, the control circuitry can read data from pages 15, 23, 31, 39, etc. Pages where errors are detected (e.g., pages 1 and 7), however, are not read.

Then, at step 310, the control circuitry can read second data from a corresponding PMX parity page of the block. The PMX parity page may thus encompass both the page and the first set of pages. For example, for page 1, the control circuitry can read second data from PMX parity page P1 (e.g., page 249 of block 200 of FIG. 2). As another example, for page 7, the control circuitry can read second data from PMX parity page P7 (e.g., page 255 of block 200 of FIG. 2).

At step 312, the control circuitry can perform an XOR function based on the first data and the second data to recover third data stored in the page. For example, the control circuitry can use the following equation to recover the third data:

$$P = A1 \oplus A2 \quad (2),$$

where P is the second data, A1 is the first data, and A2 is the third data. Thus, the control circuitry can reverse out of Equation (2) using P and A1 in order to obtain A2. After recovering the third data, process 300 may end at step 314.

In some embodiments, PMX parity pages can be extended to NVMs that include multiple dies. In fact, for multiple-die systems, PMX parity pages are even more cost effective in terms of physical space as compared to single-die systems. This is because a single PMX parity page can be shared among the multiple dies.

Figure 4:
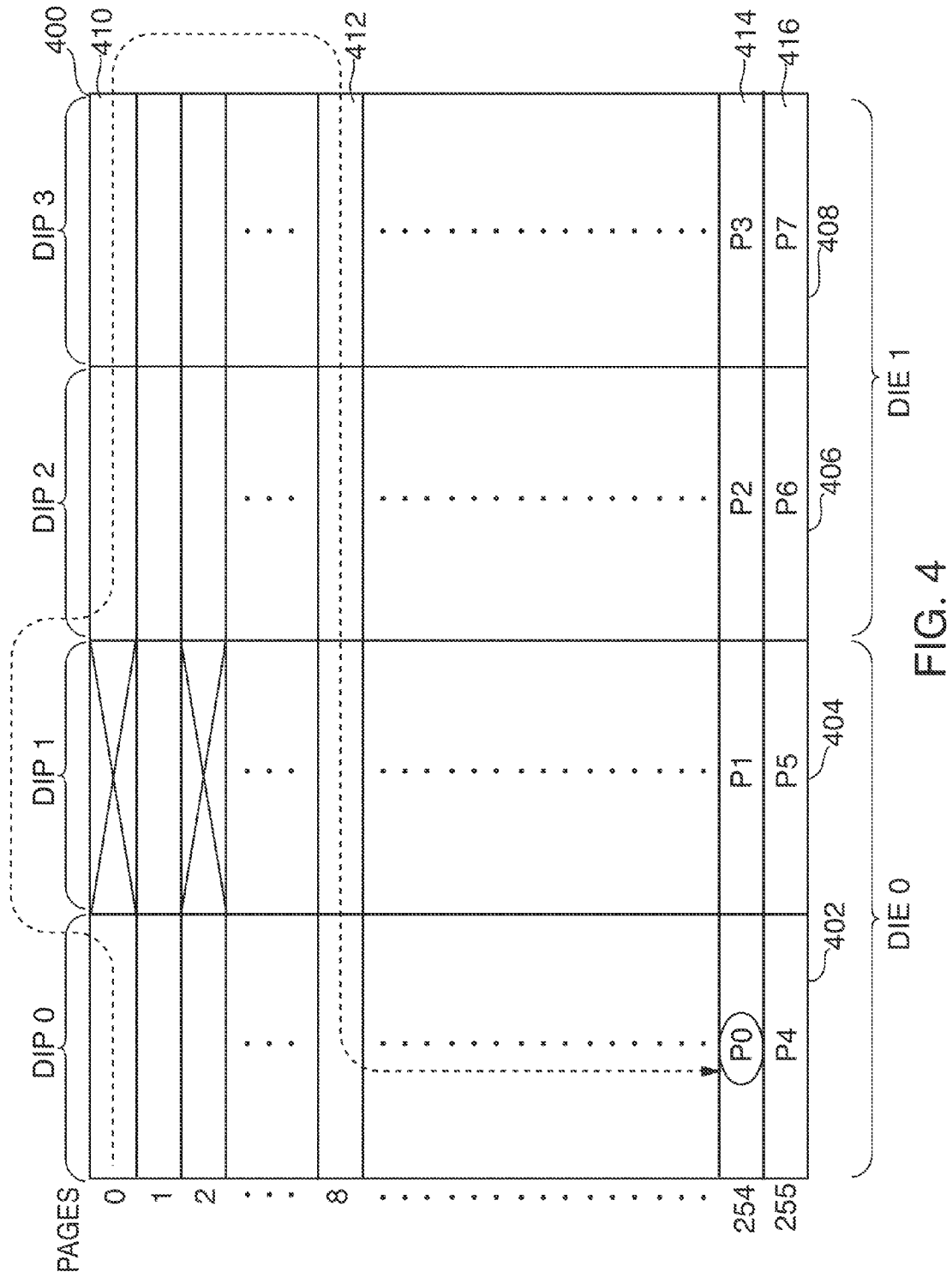
FIG. 4 is a functional view of a band of a non-volatile memory in accordance with various embodiments of the invention.

For example, turning now to FIG. 4, a functional view of a band 400 of an NVM (e.g., NVM 120 of FIG. 1) is shown. DIPs 0-3 may be assigned to the blocks of band 400 based on the various die-plane combinations provided in Table 1. Thus, in some cases, the NVM can be a dual-die dual-plane device. In addition, as in FIG. 2, pages that are crossed out with an "X" may represent those pages that have read errors.

FIG. 4 is merely meant to illustrate the organizational layout of a band and does not indicate an actual, physical layout of the non-volatile memory. For instance, although DIP 0 is illustrated as being next to DIP 1 in FIG. 4, this is merely for illustrating the functional relationship of these DIPs, and in the actual, physical layout of the NVM, these DIPs may or may not be located near one another.

As shown in FIG. 4, band 400 can include two dies (e.g., dies 0 and 1), where each die can include two blocks. For example, die 0 can include blocks 402 and 404, and die 1 can include blocks 406 and 408. In addition, each block (e.g., each of blocks 402-408) can include 256 pages (e.g., pages 0-255). Persons skilled in the art will appreciate that these numbers are merely for the purpose of illustration and that the NVM could include any suitable number of dies, blocks, and pages.

Band 400 can be formed by virtually linking or "striping" together one or more blocks (e.g., blocks 402-408). Persons skilled in the art will appreciate that blocks need not be in the same row of each die to be virtually linked as a band. In fact, blocks may be chosen randomly from two or more dies to form a band.

In addition, pages from two or more dies may be virtually linked together to form "stripes". For instance, stripe 410 can include page 0 from each of blocks 402-408. Similarly, stripe 412 can include page 8 from each of blocks 402-408.

PMX parity pages P0-P7 can be located at the end of band 400 (e.g., the last two stripes 414 and 416 of band 400 can be parity stripes). That is, PMX parity pages P0-P7 can be the last two pages (e.g., pages 254 and 255) of each of blocks 402-408. PMX parity pages P0-P7 may span across at least one stripe of band 400 (e.g., stripes 414 and 416).

In some cases, PMX parity pages P0-P7 can be located after a band log ("BLOG") table of band 400. The BLOG table can be a journal that includes information mapping the pages of band 400 to corresponding logical addresses. Persons skilled in the art will appreciate that PMX parity pages may be located at any suitable location(s) in band 400. As discussed above, the memory locations where PMX parity pages can be stored may be constrained by one or more factors such as, for example, page programming rules and/or the need to program PMX data last.

Each PMX parity page can be used to store a parity of a particular set of stripes of band 400. In some cases, the set of stripes can include pages having page numbers that can be determined according to Equation (1). For example, PMX parity page P0 can be used to store a parity of a set of stripes (e.g., stripes 410, 412, etc.) that include pages whose modulo 8 value is 0 (e.g., pages 0, 8, 16, 24, 32, etc. of blocks 402-408). Likewise, PMX parity page P1 can be used to store a parity of a set of stripes that include pages whose modulo 8 value is 1 (e.g., pages 1, 9, 17, 25, 33, etc. of blocks 402-408). For the sake of simplicity, however, not all of the pages (e.g., data pages) corresponding to each PMX parity page is shown in FIG. 2. Instead, a dashed arrow is used to indicate that multiple pages not depicted in FIG. 4 are included in the parity of PMX parity page P0.

As discussed above, because word line shorts are block-specific, blocks from multiple DIPs can share PMX parity pages. Consequently, the amount of memory that needs to be allocated for PMX parity pages relative to the total amount of memory can be amortized. In particular, for each die count doubling, the percentage of memory that needs to be allocated for PMX parity pages relative to the total amount of memory halves. For example, for a dual-die dual-plane NVM, the percentage of memory that needs to be allocated for PMX parity pages relative to the total amount of memory is approximately 0.78% (e.g., 8 PMX parity pages/(256 pages/plane/die*2 planes*2 dies)).

In some embodiments, partial parities, which can be used to recover from read errors detected when a band is only partially programmed, can also be stored. In some cases, these partial parities can be stored in another band flow. As used herein, "partial parities" can refer to parities calculated from data stored in a partially-programmed band.

For example, pages of a different band of the NVM can be allocated as partial parity pages. Then, while band 400 is being programmed, one or more parities of the programmed pages can be concurrently calculated and stored in the partial parity pages (e.g., a parity can be calculated for each set of stripes of band 400). Consequently, the partial parities can be saved during clean device shutdowns. In addition, because the partial parities are stored in another band, the amount of garbage collection can be reduced during a boot-up process following a clean shutdown.

Figure 5:
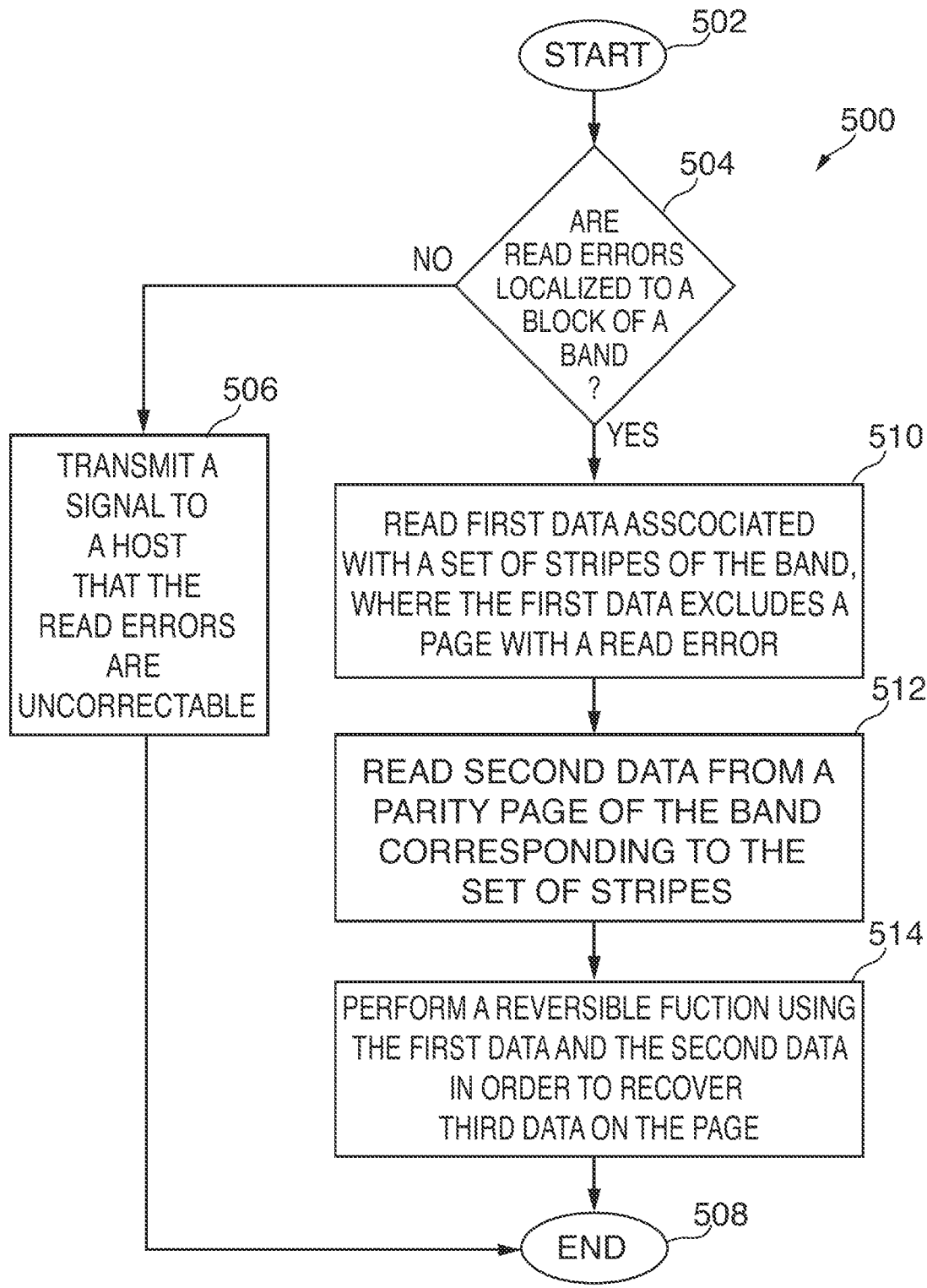
FIG. 5 is a flowchart of another illustrative process for correcting block errors in accordance with various embodiments of the invention.
Figure 6:
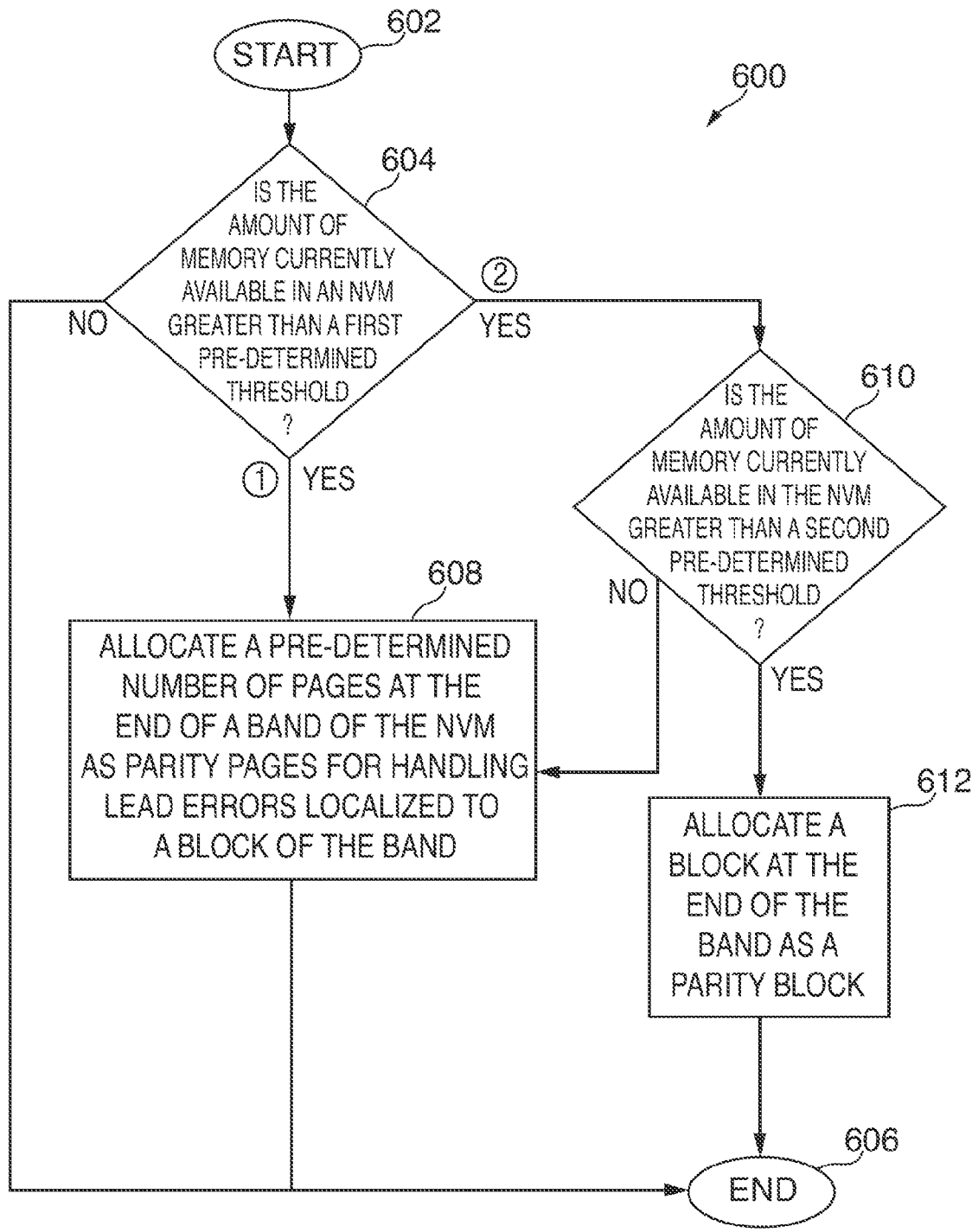
FIG. 6 is a flowchart of an illustrative process for allocating portions of a non-volatile memory for error correction in accordance with various embodiments of the invention.

Turning now to FIGS. 5 and 6, flowcharts of illustrative processes are shown. These processes may be executed by one or more components of a system (e.g., electronic device 100 of FIG. 1). For example, at least some of the steps may be performed by a control circuitry (e.g., SoC control circuitry 112 of FIG. 1) or an NVM interface (e.g., NVM interface 118 of FIG. 1). For the sake of simplicity, however, the steps in these processes will be described as being performed by a control circuitry.

Turing first to FIG. 5, process 500 may begin at step 502, and at step 504, a control circuitry can detect whether read errors are localized to a block of a band. If, at step 504, the control circuitry detects that the read errors are not localized to a block of the band, process 500 may move to step 506.

At step 506, the control circuitry can transmit a signal to a host (e.g., an application or an operating system) that the read errors are uncorrectable. Process 500 may then end at step 508. Persons skilled in the art will appreciate that the read errors may be uncorrectable if the system does not employ any other more robust error correcting technique(s). If, however, the system also uses other error correcting techniques (e.g., RMX), the control circuitry may instead employ another error correcting technique to recover errors detected on the multiple blocks.

Referring back to step 504, if the control circuitry instead detects that the read errors are localized to a block of the band, process 500 may move to step 510. This may occur, for example, if the read errors are single-page uECCs or are caused by word line shorts. For instance, as shown in FIG. 4, the control circuitry can detect read errors on pages 0 and 2 of block 404.

At step 510, the control circuitry can read first data associated with a set of stripes of the band, where the first data excludes a page with a read error. For example, referring to FIG. 4, the control circuitry can read first data associated with a set of stripes (e.g., including stripes 410 and 412). However, the control circuitry will skip the page (e.g., page 0 of block 404) with the read error, where the page is located in the block with the read errors.

Then, at step 512, the control circuitry can read second data from a parity page of the band corresponding to the set of stripes. For example, for page 0 of block 404, the control circuitry can read second data from PMX parity page P0 (e.g., page 254 of block 402 of FIG. 4). As another example, for page 2 of block 404, the control circuitry can read second data from PMX parity page P2 (e.g., page 254 of block 406 of FIG. 4).

Continuing to step 514, the control circuitry can perform a reversible function using the first data and the second data in order to recover third data on the page. The control circuitry can use any suitable reversible function such as, for example, an XOR function, an addition function, or a multiplication function. Thus, in some cases, the control circuitry can use Equation (2) to recover the third data. Process 500 may then end at step 508.

Accordingly, by allocating a particular number of pages of a band as PMX parity pages, a system can recover from errors localized to a single block of a band (e.g., a single block having single-page uECCs or suffering from a word line short).

Turning now to FIG. 6, a flowchart of illustrative process 600 is shown for allocating portions of a non-volatile memory for error correction. Process 600 may begin at step 602, and at step 604, a control circuitry can detect whether an amount of memory currently available in an NVM is greater than a first pre-determined threshold. If, at step 604, the control circuitry detects that the amount of memory currently available in the NVM is not greater than the first pre-determined threshold, process 600 may end at step 606. That is, the control circuitry may have determined that there is not enough memory to implement an error correcting technique.

Referring back to step 604, if the control circuitry instead detects that the amount of memory currently available in the NVM is greater than the first pre-determined threshold, process 600 may proceed in one of two ways. In one embodiment, process 600 may proceed to step 608.

At step 608, the control circuitry can allocate a pre-determined number of pages (e.g., eight pages) at the end of a band of the NVM (e.g., band 400 of FIG. 4) as parity pages for handling read errors localized to a block of the band (e.g., block 404 of FIG. 4). For example, the parity pages can be PMX parity pages. After allocating the pre-determined number of pages, process 600 may end at step 606. Thus, in this embodiment, the control circuitry may automatically implement PMX if it determines that there is enough memory space.

In another embodiment, after detecting that the amount of memory currently available in the NVM is greater than the first pre-determined threshold at step 604, process 600 may proceed to step 610. At step 610, the control circuitry can detect whether the amount of memory currently available in the NVM is greater than a second pre-determined threshold. The second pre-determined threshold can be larger than the first pre-determined threshold.

If, at step 610, the control circuitry detects that the amount of memory currently available in the NVM is not greater than a second pre-determined threshold, process 600 may move to step 608. Thus, the control circuitry may have determined that the device is relatively limited in NVM storage space. Accordingly, the control circuitry may select to implement PMX.

If, at step 610, the control circuitry detects that the amount of memory currently available in the NVM is greater than a second pre-determined threshold, process 600 may move to step 612. Thus, the control circuitry may have determined that the device has a relatively large amount of NVM storage space.

At step 612, the control circuitry can allocate a block at the end of the band as a parity block. For example, the control circuitry can allocate block 408 (FIG. 4) as a parity block. Thus, in these embodiments, the control circuitry may select to implement RMX because there is more storage space available. Process 600 may then end at step 606.

Accordingly, a system can select whether or not to implement an ECC technique and/or which type of ECC technique to implement based on the amount of storage space available. Thus, upon detecting one or more errors in a band of an NVM, the system can determine whether an appropriate ECC technique is turned on or off. For example, the system can check the state of a band to determine whether the band has PMX, RMX, or no ECC techniques. If the appropriate ECC technique is turned on (e.g., PMX is implemented), the system can follow a process similar to process 500 (FIG. 5) to recover the data.

It should be understood that processes 300, 500, and 600 of FIGS. 3, 5 and 6 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A memory interface for accessing a non-volatile memory ("NVM"), the memory interface comprising control circuitry operative to:
   detect whether an amount of memory currently available in the NVM is greater than a first pre-determined threshold; and
   in response to detecting that the amount of memory currently available is greater than the first pre-determined threshold, allocate a pre-determined number of pages at the end of a band of the NVM as parity pages for handling read errors localized to a block of the band.

2. The memory interface of claim 1, wherein the pre-determined number of pages is based on vendor-specific characteristics of the NVM.

3. The memory interface of claim 1, wherein the pre-determined number of pages span across at least one stripe of the band.

4. The memory interface of claim 1, wherein the pre-determined number of pages are located after a log table of the band.

5. The memory interface of claim 1, wherein the control circuitry is further operative to:
   detect whether the amount of memory currently available is greater than a second pre-determined threshold, wherein the second pre-determined threshold is larger than the first pre-determined threshold; and
   in response to detecting that the amount of memory currently available is greater than the second pre-determined threshold, allocate a block at the end of the band as a parity block.

6. The memory interface of claim 1, wherein the control circuitry is further operative to allocate a plurality of pages of a different band of the NVM as partial parity pages, wherein partial parities stored in the partial parity pages are used to recover from the read errors detected when the band is only partially programmed.

7. A method for allocating portions of a non-volatile memory ("NVM") for error corrections using a memory interface through control circuitry, the method comprising:
   detecting whether an amount of memory currently available in the NVM is greater than a first pre-determined threshold; and
   in response to detecting that the amount of memory currently available is greater than the first pre-determined threshold, allocating a pre-determined number of pages at the end of a band of the NVM as parity pages for handling read errors localized to a block of the band.

8. The method of claim 7, wherein the pre-determined number of pages is based on vendor specific characteristics of the NVM.

9. The method of claim 7, wherein the pre-determined number of pages span across at least one stripe of the band.

10. The method of claim 7, wherein the pre-determined number of pages are located after a log table of the band.

11. The method of claim 7, wherein the second pre-determined threshold is larger than the first pre-determined threshold.

12. The method of claim 7, wherein upon detection of available memory is greater than the second pre-determined threshold, allocate a block at the end of the band as a parity block.

13. The method of claim 7, wherein the control circuitry may allocate a plurality of pages of a different band of the NVM as partial parity pages, wherein partial parities stored in the partial parity pages are used to recover from the read errors detected when the band is only partially programmed.

14. A system comprising:
non-volatile memory ("NVM"); and
memory interface comprising control circuitry coupled to the NVM;
means for detecting whether the amount of memory currently available in the NVM is greater than a first pre-determined threshold;
in response to detecting that the amount of memory currently available is greater than the first pre-determined threshold, means for allocating a pre-determined number of pages at the end of a band of the NVM as parity pages for handling read errors localized to a block of the band.

15. The system of claim 14 wherein the pre-determined number of pages is based on vendor-specific characteristics of the NVM.

16. The system of claim 14 wherein the pre-determined number of pages span across at least one stripe of the band.

17. The system of claim 14 wherein the pre-determined number of pages are located after a log table of the band.

18. The system of claim 14, further comprising:
means for detecting whether the amount of available memory is greater than a second pre-determined threshold, wherein the second pre-determined threshold is larger than the first pre-determined threshold; and
in response to detecting that the amount of memory currently available is greater than the second pre-determined threshold, means for allocating a block at the end of the band as a parity block.

19. The system of claim 14, wherein the control circuitry is further operative to allocate a plurality of pages of a different band of the NVM as partial parity pages, wherein partial parities stored in the partial parity pages are used to recover from the read errors detected when the band is only partially programmed.

* * * * *